United States Patent
Spuller

(10) Patent No.: US 11,911,739 B2
(45) Date of Patent: Feb. 27, 2024

(54) SUPPORT GRID FOR FILLING MATERIAL PACKING

(71) Applicant: SGL CARBON SE, Wiesbaden (DE)

(72) Inventor: Ralph Spuller, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 576 days.

(21) Appl. No.: 15/734,366

(22) PCT Filed: May 12, 2020

(86) PCT No.: PCT/EP2020/063189
§ 371 (c)(1),
(2) Date: Dec. 2, 2020

(87) PCT Pub. No.: WO2020/234049
PCT Pub. Date: Nov. 26, 2020

(65) Prior Publication Data
US 2021/0162366 A1 Jun. 3, 2021

(30) Foreign Application Priority Data
May 17, 2019 (DE) ...................... 10 2019 207 260.7

(51) Int. Cl.
*B01J 19/30* (2006.01)
*B01D 3/32* (2006.01)
*B01J 8/44* (2006.01)

(52) U.S. Cl.
CPC ............ *B01J 19/305* (2013.01); *B01D 3/326* (2013.01); *B01J 8/44* (2013.01); *B01J 2208/00884* (2013.01)

(58) Field of Classification Search
CPC ... B01D 3/00; B01D 3/14; B01D 3/32; B01D 3/324; B01D 3/326; B01J 8/00; B01J 8/18; B01J 8/24; B01J 8/44; B01J 19/00; B01J 19/30; B01J 19/305; B01J 2208/00; B01J 2208/00796; B01J 2208/00884; B01J 2219/00; B01J 2219/31;
(Continued)

(56) References Cited

U.S. PATENT DOCUMENTS 4,107,241 A * 8/1978 Braun ...................... B01D 3/22
428/116
7,988,931 B2 * 8/2011 Klinger ...................... B01J 8/44
29/525.01

FOREIGN PATENT DOCUMENTS

DE  2516078 A1 10/1976
DE  3842637 A1 7/1990
DE  10 2004 015 393 A1 1/2005
(Continued)

OTHER PUBLICATIONS

International Search Report dated Jul. 20, 2020 in corresponding International application No. PCT/EP2020/063189; 4 pages.

*Primary Examiner* — Natasha E Young
(74) *Attorney, Agent, or Firm* — Maier & Maier, PLLC

(57) ABSTRACT

A support grid for filling material packing and to a component set for producing such a support grid, including support strips and top strips which are inclined relative to one another in opposite directions. The support strips and top strips intersect one another, the inclination of each top strip is defined by at least one top strip receiving groove which is made in at least one support strip and in which the top strip is received, and the orientation of each support strip is stabilised by at least one support strip receiving groove in which the support strip is received.

18 Claims, 5 Drawing Sheets

(58) Field of Classification Search
CPC .............................. B01J 2219/32–32206; B01J 2219/32213–32244
See application file for complete search history.

(56) References Cited

FOREIGN PATENT DOCUMENTS

| | | |
|---|---|---|
| DE | 10 2006 028 407 B3 | 3/2008 |
| DE | 20 2010 015 436 U1 | 3/2011 |
| EP | 0 374 443 A2 | 6/1990 |

\* cited by examiner

SUPPORT GRID FOR FILLING MATERIAL PACKING

FIELD

The invention relates to a support grid and a support grid cutout for filling material packing, and to component sets for support grids and support grid cutouts according to the invention.

BACKGROUND

A variety of different support grids for filling material packing are known in the prior art.

In DE 10 2004 015 393 A1, support grids are described in particular for use in the proximity of aggressive media for storing packing in a column. The support grids have a plurality of trapezoidal shapes, each of which has two side surfaces, an upper end surface and support surfaces oriented downwards. Each trapezoidal shape appears to be formed by a separate, trapezoidally-shaped plate element. A support grid having a plurality of trapezoidal formations running parallel to one another is created when the shaped plate elements are aligned so as to be parallel to one another, edge to edge. The structure is complex, since specifically adapted clamping and locking elements are also required. The materials mentioned include: highly fluorinated plastics, for example PFA, MFA, FEP, PTFE, or partially fluorinated plastics, for example ECTFE, PVDF, and plastics that are difficult to weld, for example PE-X or PE-UHMW.

DE 38 42 637 A1 describes a combined component that is intended to function both as a filling material packing support grid and as a collecting or distributor base. In this case, inclined deflection plates are provided; liquid should be transferred from their lower edges into channels which are part of the component. The connection between the channels and the deflection plates can be made by means of a carrier. This is inserted into a slot in the channel walls and into a slot in the deflection plate. Variants of the component having deflecting plates inclined in opposite directions are also described, in which two deflecting plates inclined one above the other are provided for each channel The liquid first runs along the upper inclined plate and drips from the lower edge of the same onto the next deflection plate.

The support grid disclosed in patent specification DE 10 2006 028 407 B3 comprises plate-shaped support strips which are arranged so as to be perpendicular to the installation plane and are connected in a cross shape to spacer strips arranged so as to be perpendicular to the installation plane. Contour strips which have openings are arranged in the direction of the spacer strips. The contour strips are inclined so that they offer a support surface for the filling material. The support strips are not continuous. The disclosed support grid comprises pre-assembled groups of support strips, spacer strips and contour strips, the support strips of the individual groups being offset from one another by the value of their width and overlapping to an extent such that they can be connected by plug-in clips attached from above.

SUMMARY

The present invention is based on the object of providing a support grid for filling material packing, which can be manufactured particularly economically, is particularly light and at the same time particularly mechanically resilient due to its construction, and can be designed to be divided into preassembled groups, substantially without impairing the load-bearing capacity, which can be inserted into columns through manholes.

This object is achieved by a support grid for filling material packing, comprising support strips and top strips which are inclined relative to one another in opposite directions, wherein the support strips and top strips intersect one another, the inclination of each top strip is defined by at least one top strip receiving groove which is made in at least one support strip and in which the top strip is received, and the orientation of each support strip is stabilised by at least one support strip receiving groove in which the support strip is received.

Many support grids in the prior art have spacer strips which intersect the support strips running in parallel with one another, and ultimately serve to support the support strips so that they do not tilt laterally. In the case of the support grid according to the invention, this function is taken over in whole or in part by the top strips. The top strips take on the support function of the spacer strips known from the prior art, and at the same time form the surface on which the filling material rests. This means considerable material and cost savings. The support grid according to the invention can therefore be produced particularly economically.

It is generally preferred that the support strips are not inclined. In general, the width of each support strip exceeds the thickness of each support strip many times over, so that the support strips each have two primary surfaces arranged opposite one another. Preferably, all of the primary surfaces of the support strips lie in planes which run parallel with one another. In the context of the present invention, 'in parallel with one another' means that the planes form an angle of at most 10° with respect to one another.

The support strips can also be inclined with respect to one another. However, it is assumed that the support grid is then less torsion-resistant and therefore less resilient.

'Inclined with respect to one another in opposite directions' means that the top strips (in pairs of top strips, if there are four or more top strips) are oriented relative to one another in a manner similar to the two halves of a gable roof. In general, the upper longitudinal edges and the lower longitudinal edges of the top strips are spaced apart, such that a fluid passage opening is formed between adjacent strips. A person skilled in the art selects the width of the fluid passage openings according to the dimensions of the filling materials used, such that the filling material cannot fall between the longitudinal edges of the top strips.

Due to the inclination of the top strips and the vertical orientation of the column in which the support grid will be installed, an upper top strip region and a lower top strip region are defined for each top strip, wherein the upper top strip region comprises every part of the top strip that is closer to an upper longitudinal edge of the top strip, and the lower top strip region includes every part of the top strip that is closer to a lower longitudinal edge of the top strip. At least one lower region of each top strip is preferably received in at least one top strip receiving groove. Top strip receiving grooves made in support strips are therefore preferably introduced into the support strips proceeding from the upper longitudinal edges of the support strips.

The statement indicating that the support strips and top strips intersect one another refers to the profile of the projected longitudinal edges of the support strips and top strips. Where support strips and top strips intersect one another, at least one projected longitudinal edge of a support strip intersects a projected longitudinal edge of a top strip if the support grid is projected by parallel projection along the longitudinal axis of the column into a plane oriented orthogonally to the longitudinal axis of the column.

In typical configurations of the support grid according to the invention, support strips do not intersect one another and the top strips do not intersect one another either.

According to the invention, the orientation of each support strip is stabilised by at least one support strip receiving groove in which the support strip is received. Stabilisation of the orientation in this context means in particular that the support strip can no longer be rotated without restriction about its longitudinal axis, since it is received in the support strip receiving groove. Rotation about the longitudinal axis is prevented by the fact that the portion of the support strip received in the support strip receiving groove hits the walls of the support strip receiving groove. It goes without saying that the shape of the support strip receiving groove is preferably adapted to the portion of the support strip which is received, in such a manner that the support strip rests lies in the support strip receiving groove with a positive connection. This increases the torsional stiffness of the support grid.

The orientation of at least one support strip is preferably stabilised by more than one support strip receiving groove. This counteracts undesirable torsions of the support strip about its longitudinal axis particularly efficiently. This is because torsion is essentially only possible in the areas of the support strip that are outside the support strip receiving groove.

In connection with the present invention, it was discovered that the support strips can be made from significantly cheaper, less torsionally stiff materials without the torsional rigidity of the support grid decreasing overall if support strip receiving grooves are present at sufficiently small intervals. Building on this, particularly advantageous developments of the invention are proposed. According to these further developments of the invention, portions of the support strip which are located in different support strip regions are received in different support strip receiving grooves.

Preferably, a portion of the support strip that lies in one support strip region is received in a support strip receiving groove, and a further portion of the support strip that lies in another support strip region is received in a further support strip receiving groove. One support strip region extends along the longitudinal axis of the support strip from one end to the centre of the support strip. The other support strip region extends along the longitudinal axis of the support strip from the centre to the other end of the support strip. Advantageously, at least two, three or particularly preferably at least four portions of the support strip are each received in different support strip receiving grooves in each of the two support strip regions. The support strip receiving grooves generally maintain a minimum distance from the next support strip receiving groove of at least 2% of the length of the support strip. The distance between two support strip receiving grooves on the assembled support grid is determined between the two closest points of the two grooves.

Significantly less strip material is required for the support grid according to the invention—for example in comparison to the support grid construction described in DE 10 2006 028 407 B3. Instead of spacer strips, simple grooves can now be used according to the invention to accommodate the support strips. In a roughly simplified manner, the present invention proposes to replace a component of the prior art with a groove—that is, with a recess in a component. Despite the material saved due to the design, there is no loss of stability. It is particularly preferred if at least one of the support strip receiving grooves is made in at least one top strip. This also and especially applies to the support strip receiving grooves which are described in connection with the above-mentioned, particularly advantageous developments of the invention. For example, at least 50%, in particular at least 65% or, particularly preferably, at least 80% of all support strip receiving grooves can be made in top strips. The top strips and support strips then stabilise one another. Due to the synergistic interaction of the top and support strips, which are mutually accommodated in receiving grooves, a particularly light and stable support grid can be provided.

Alternatively (or additionally), however, it is also possible that the support strip receiving groove (or at least one support strip receiving groove) is not made in a top strip, but in a further component different from the top strips and the support strips.

The further component can be a support strip receiving element via which a force of gravity acting on the support grid can be transmitted to the column wall. The support strip receiving element can, for example, be designed in such a way that it can rest on a support surface of at least one support element provided on the column wall. The support strip receiving element can be, for example, a support strip receiving strip.

The invention does not exclude additional spacer strips that are connected in a cross shape to the support strips and are arranged in the direction of the top strips, as described in DE 10 2006 028 407 B3. Top strips are referred to as contour strips in DE 10 2006 028 407 B3.

Since, according to the invention, the spacer strips are substantially dispensable, the mass of any spacer strips that may be present should, however, be at most 0 to 150% of the mass of the support strips, preferably at most 0 to 100% of the mass of the support strips, more preferably at most 0 to 75% of the mass of the support strips, particularly preferably at most 0 to 50% of the mass of the support strips, and very particularly preferably at most 0 to 20% of the mass of the support strips. Ideally, the support grid according to the invention has no spacer strips. Herein, a spacer strip is defined as any strip wherein both main surfaces are orthogonal to a supporting surface of the support grid and that are connected in a cross shape with at least two support strips. The supporting surface is the area in which the upper longitudinal edges of the supporting strips are located.

It is not absolutely necessary for at least one of the two strips to have a groove in which the other strip is received at every point at which a support strip intersects a top strip. For example, the strips can also be narrower in a region in which they intersect than in other regions. In this region, the lowest edge of the top strip can then run above the highest edge of the support strip, so that the two strips can intersect at this point without a groove. It is only strictly necessary that the inclination of each top strip is defined by at least one top strip receiving groove made in at least one support strip. For each top strip, therefore, it is not necessary to have more than one top strip receiver introduced into at least one support strip. This is enough to define the slope of the top strip.

However, it has proven to be particularly advantageous if the inclination of each top strip is defined by more than one top strip receiving groove made in different support strips. This way, the regions bridged by the top strips are shorter. The same torsional stiffness of the support grid can then be achieved with even thinner strips, the production of which requires significantly less material and labour. Based on this, advantageous developments of the invention are proposed. According to these further developments of the invention, portions of the top strip that lie in different top strip regions are received in different top strip receiving grooves. Preferably, a portion of the top strip that lies in a top strip region is received in a top strip receiving groove, and a further portion of the top strip that lies in another top strip region is received in a further top strip receiving groove. One top strip region extends along the longitudinal axis of the top strip from one end to the centre of the top strip. The other top strip region extends along the longitudinal axis of the top strip from the centre to the other end of the top strip. Advantageously, at least two, three, or particularly preferably at least four portions of the top strip are each received in different top strip receiving grooves in each of the two top strip regions. The top strip receiving grooves generally maintain a minimum distance from the next top strip mounting groove of at least 2% of the length of the top strip. The distance between two top strip grooves on the top grid is determined between the two closest points of the two grooves. Very particularly advantageous developments of the invention also have the features of the particularly advantageous developments of the invention described above.

At each point at which a support strip intersects a top strip, a top strip receiving groove can be made in the support strip and/or a support strip receiving groove can be made in the top strip.

It is advantageous if at least at one point at which a support strip intersects a top strip, a top strip receiving groove and a support strip receiving groove interlock. As a result of the interlocking of the grooves, either the top strips can be made thinner or the number of support strips can be reduced, since the interlocking of the grooves results in a particularly rigid connection of the strips. Ultimately, the same torsional stiffness is achieved with less wide, less thick and/or fewer strips—that is to say, a support grid is provided which fully meets the requirements for mechanical stability with particularly little material. This has also proven particularly useful in process engineering applications, not least of all because the interlocking of the grooves leads to an overall particularly thin support grid which can still bear high loads. For a given column height, a greater proportion of the column is available for the packed bed, thereby making it possible, for example, to increase the efficiency of a thermal separation process being carried out.

At at least one point at which a support strip intersects a top strip, the depth T of the support strip receiving groove is preferably smaller than the height H of a portion of the top strip protruding beyond the support strip. The height and depth specified here are measured on the assembled support grid, for example with a tape measure, along the upper surface of the top strip facing the column head. This is indicated by way of example in FIG. 3C. The mass of the filling material lying on it causes in particular a bending of the portion of the top strip protruding beyond the support strip and a bending of the portion of the top strip extending downwards beyond the depth of the support strip receiving groove. The bending of the portion of the top strip that projects beyond the support strip reduces the width of the gaps between the upper longitudinal edges of adjacent top strips that are inclined towards one another. This is not critical, since a reduction in the width does not entail any risk of the packing elements falling through undesirably.

However, the bending of the portion of the top strip that extends downward beyond the depth of the support strip receiving groove increases the width of the gaps between the lower longitudinal edges of adjacent top strips inclined away from one another. This creates the risk of the packing elements falling through undesirably. If T is smaller than H, the lower edges of the top strips are bent apart less strongly due to the mass of the packing lying on top, such that, overall, packing elements are effectively prevented from falling through. On the other hand, if H were less than T, this goal could only be achieved with thicker, more torsion-resistant top strips.

Support grids according to the invention have fluid passage openings through which gases can rise and liquids can descend. In general, fluid passage openings are made in the top strips. In addition, the gaps between the upper longitudinal edges of adjacent top strips inclined towards one another and the gaps between the lower longitudinal edges of adjacent top strips inclined away from one another represent fluid passage openings. A support grid according to the invention thus has fluid passage openings in and/or between top strips. The sum of the fluid passage areas defined by the fluid passage openings is preferably greater than the column cross section. The sum is found by adding the fluid passage areas of all fluid passage openings introduced into the top strips, measured in each level of top strips, to the areas of all fluid passage openings between the upper and lower longitudinal edges of the top strips.

With regard to the choice of material for the support strips and top strips, there are no particular restrictions. The support strips and/or top strips can be constructed from all materials and material combinations which are generally known to the person skilled in the art for producing column internals. This includes composite materials and layered composite materials, each of which can also be coated. The support strips and/or top strips preferably have a material that cannot alone be joined by a material bond. "Cannot be independently integrally bonded" refers to a material for which two flat surfaces of the material cannot be independently integrally bonded. A material which cannot be independently integrally bonded can therefore not be welded, in particular without welding filler materials. The advantages of the invention are then fully realised, because material bonding processes cannot be employed at the site of the receiving grooves proposed according to the invention (for example, welding the strips at the points where they intersect). Many lightweight construction materials with high strengths, which at the same time have high temperature resistance and chemical resistance (for example, CFC), cannot be independently integrally bonded—that is, for example, they cannot be welded without welding filler materials. According to the invention, particularly strong and torsion-resistant lightweight grids are made possible, which at the same time have high temperature resistance and chemical resistance and in which each individual part can be easily exchanged without having to reverse materially bonded strip connections.

In particularly preferred support grids according to the invention, the support strips (1) and/or top strips (2) have a fibre composite material. Support grids according to the invention which are particularly light, but at the same time torsion-resistant and, moreover, offer particularly high temperature resistance and chemical resistance, can be produced from these materials.

The fibre composite material preferably comprises at least one flat textile fabric. The continuous fibre strands result in a further significant increase in strength and rigidity compared to fibre-reinforced plastics (based on short fibres). In this way, the support grid can bear greater mechanical loads, or the same mechanical load strength can be achieved with fewer and/or thinner or narrower strips. The textile fabrics can be, for example, non-woven fabrics, knitted fabrics, woven fabrics or non-crimp fabrics, wherein woven fabrics and non-crimp fabrics, in particular non-crimp fabrics, are preferred. According to the invention, it is particularly preferred if at least one flat textile fabric is a unidirectional fabric. In contrast to the woven fabrics, the fibre strands are straight and are not repeatedly deflected by the warp and weft system. This results in further optimised strength and rigidity, as well as efficient production of the strips and the support grid.

In very particularly preferred support grids according to the invention, the material that cannot alone be joined by a material bond or the fibre composite material comprises carbon fibres. This results in the highest strength combined with the high temperature resistance and excellent chemical resistance of the carbon. For example, the non-crimp fabric and, in particular, the unidirectional non-crimp fabric, can comprise carbon fibres; the textile fabric is therefore preferably a carbon fibre non-crimp fabric, or a unidirectional carbon fibre non-crimp fabric. The top strips and/or the support strips can have carbon fibre reinforced carbon (CFC), carbon fibre reinforced plastic (CFRP) or glass fibre reinforced plastic (GFRP), or consist of CFC, CFRP or GFRP.

Each of the top strips can be formed in one piece or in several pieces.

If the support grid can be placed in the column from above at the time when a (segmented) column is being built and before the head of the column is attached, it is generally advantageous if all the top strips are made in one piece. This way, the top strips are particularly stable, and a support grid which is particularly torsion-resistant and can bear particularly high mechanical loads can be realised with particularly thin and/or narrow strips.

If, on the other hand, the support grid will be placed in a column that is closed at the top and bottom, this is only possible via an opening arranged on the side of the column, for example via a so-called manhole. The diameter of the manhole is usually significantly smaller than the diameter of the column, so that the support grid cannot be inserted into the column in one piece via the manhole. It is then preferred if at least one top strip has at least two separate top strip portions which are joined together to form the top strip. In the case of the support grid according to the invention, preferably no top strip and no top strip portion is longer than 75% of the length of the longest top strip. It is particularly preferred if no top strip and no top strip portion is longer than 55% of the length of the longest top strip. This significantly simplifies the installation of the support grid via a manhole. Several preassembled support grid cutouts, which will be described in more detail below, can be inserted into the column through the manhole and connected to the support grid by connecting top strip portions of the different adjacent support grid cutouts in the column. This considerably shortens the support grid installation work which must be performed in the column, because all the support grid cutouts can be pre-assembled outside the column. The same simplifications result when dismantling the support grid.

Two top strip portions that can be connected to form a top strip or to form a longer top strip portion can each have an overlap region in which the two connected top strip portions overlap. The two overlapping regions have elements with which the two top strip portions can be connected to form a continuous top strip or to form the longer top strip portion. This can be achieved in the most varied of ways, for example by screwing the overlapping top strip portions together with preferably two or more screws.

In order to connect the two top strip portions to form a continuous top strip or to form the longer top strip portion, an opening can be provided in each of the two overlapping regions. The two openings are preferably designed in such a manner that a connecting element can only be inserted into both openings when the two top strip portions have assumed the relative orientation desired for the top strip to be formed. Connecting element regions of the connecting element, provided for this purpose, can then be inserted into the two openings, such that the desired connection of the top strip portions is established. Then the connection element is fixed in this position.

The two openings can be slots, with both slots preferably being of the same width and length. They are aligned when the top strip portions have assumed the orientation relative to one another that is desired for the top strip to be formed. A bolt that is guided through the two aligned slots can then serve as a connecting element. The bolt preferably has a positive annular overlap of the strip material which surrounds the slots. The bolt may have a head portion that prevents the bolt from slipping through the slots. The bolt can also have a receptacle for a bolt securing element. The receptacle and the bolt securing element are designed and arranged in this case such that the bolt can no longer be moved out of the slots when the bolt securing element is in place. The bolt securing element can, for example, be the element shown in FIGS. 3A-3D of utility model DE 20 2010 015 436 U1. The bolt and bolt securing element can be made of the same material from which the top strips and/or support strips are made.

Different top strip portions of a top strip can therefore preferably be connected reversibly, and can be detached from one another. This has the advantage that the support grid can also be dismantled again via the manhole.

It is preferred if all top strips and top strip portions are shorter than the longest support strip. It is particularly preferred if no top strip and no top strip portion is longer than 55% of the length of the longest support strip. It is particularly preferred if all the top strips and top strip portions are at most half as long as the longest support strip.

The invention also relates to a support grid cutout that can be inserted into a column via a manhole, comprising support strips and top strip portions inclined relative to one another in opposite directions, wherein support strips and top strip portions intersect one another, the inclination of each top strip portion is defined by at least one top strip receiving groove which is made in at least one support strip and in which the top strip portion is received, and the orientation of each support strip is stabilised by at least one support strip receiving groove in which the support strip is received. At least one of the support strip receiving grooves can be made in at least one top strip portion.

What is written here with regard to the different types of strips (in particular support strips, top strips, but also spacer strips) and with regard to the top strip receiving groove(s) as well as the support strip receiving groove(s), also applies in connection with the support grid cutout.

The invention further relates to a component set for a support grid according to the invention or for a support grid cutout according to the invention, comprising support strips and top strips or top strip portions, wherein there is at least one top strip receiving groove made in at least one support strip for each top strip or top strip portion, and the top strips or top strip portions can be received therein in such a manner that the top strips or the top strip portions are inclined relative to one another in opposite directions, and there is at least one support strip receiving groove for each support strip, which is made in at least one top strip or in at least one top strip portion and in which the support strips can be received in such a manner that the orientation of each support strip is stabilised.

What is written here with regard to the different types of strips (in particular support strips, top strips, but also spacer strips) and with regard to the top strip receiving groove(s) as well as the support strip receiving groove(s), also applies in connection with the component set.

BRIEF DESCRIPTION OF THE FIGURES

The invention is illustrated by the following figures and exemplary embodiments, without being restricted thereto.

DETAILED DESCRIPTION

Figure 1:
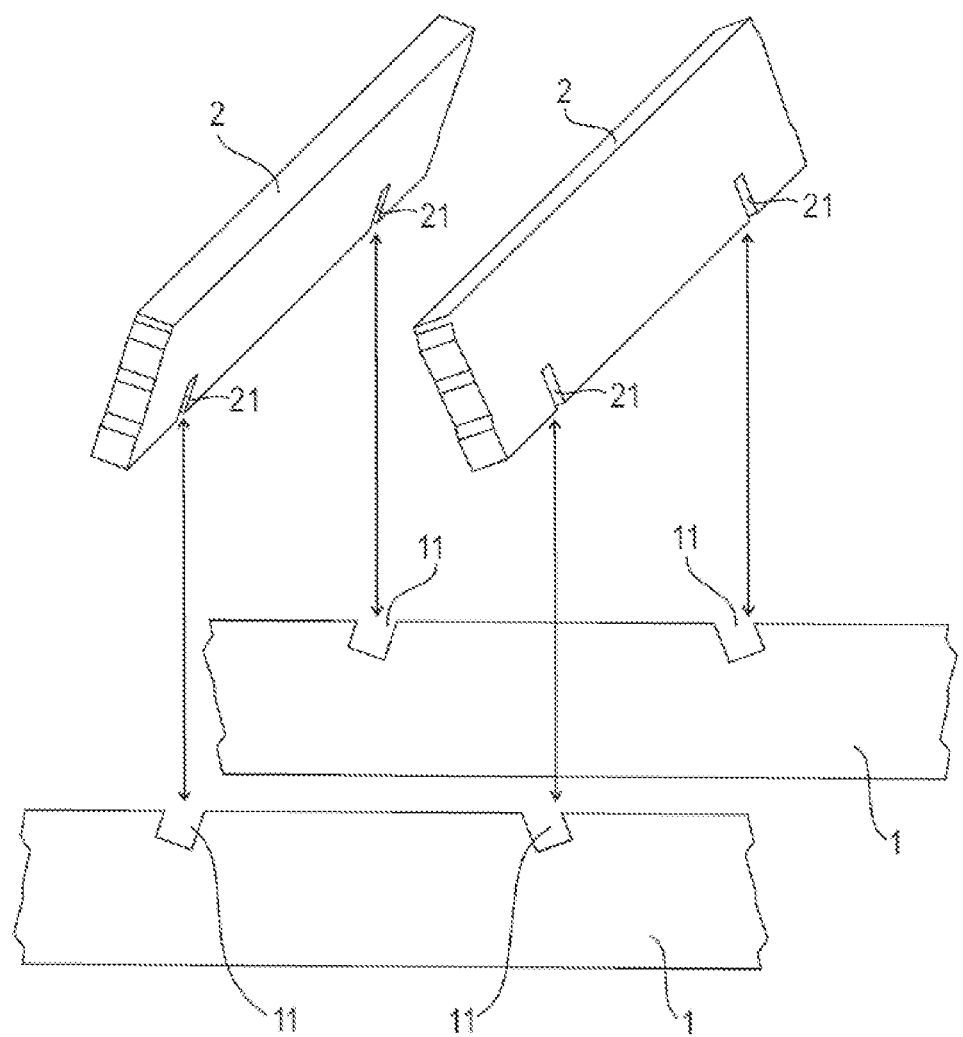
FIG. 1 shows a section of a component set according to the invention, for the production a support grid according to the invention.

In the section shown in FIG. 1, arrows indicate how top strip receiving grooves 11 made in the support strips 1 and support strip receiving grooves 21 made in the top strips 2 interlock in the specific support grids that are particularly preferred according to the invention.

Figure 2:
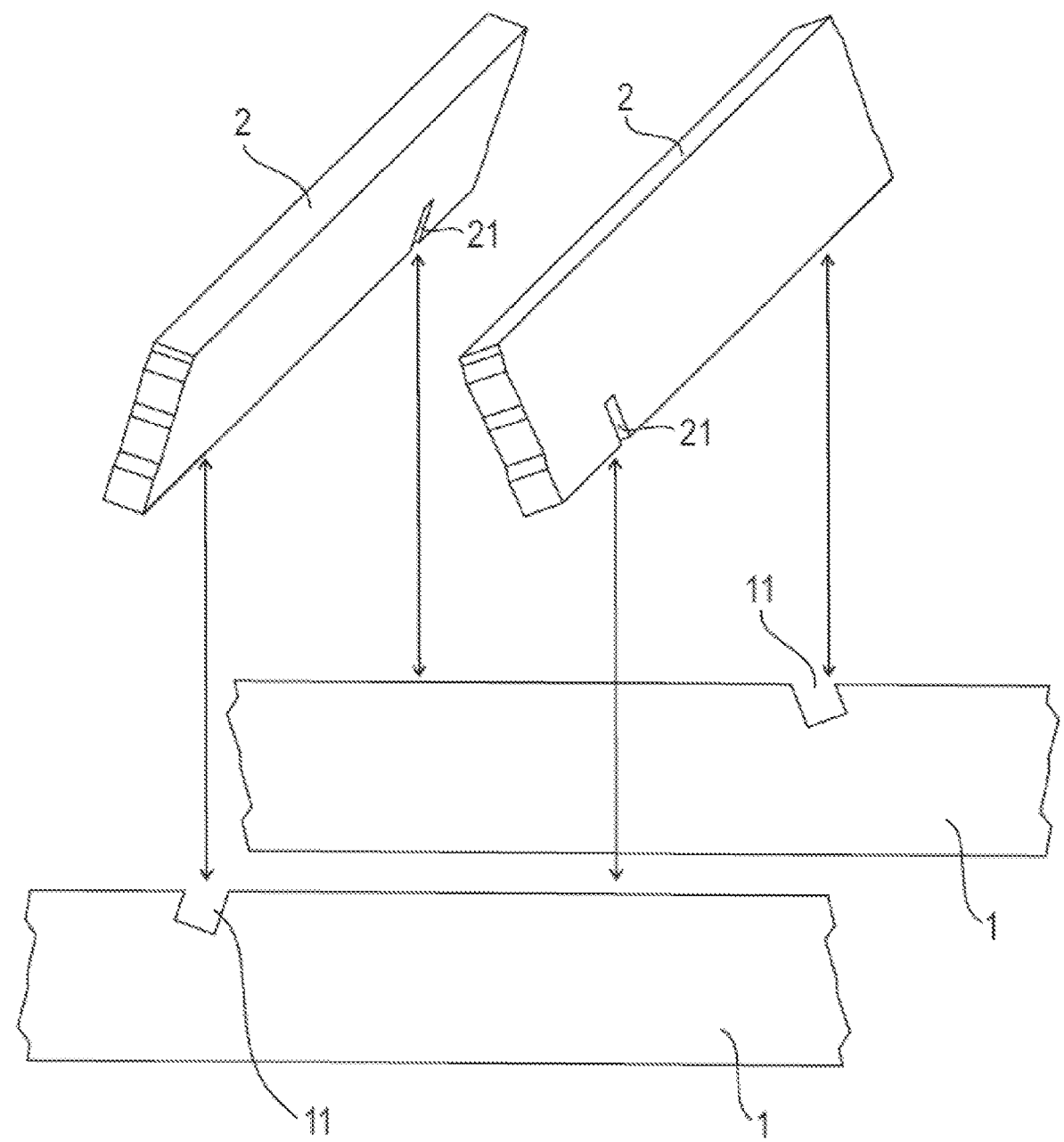
FIG. 2 shows a section of a further component set according to the invention, for the production of a further support grid according to the invention.

According to the present invention, it is preferred that top strip receiving grooves 11 and support strip receiving grooves 21 interlock, for example as shown in FIG. 1. FIG. 2 shows that this does not necessarily have to be the case. In FIG. 2, as claim 1 also covers, the inclination of each top strip 2 is defined by a top strip receiving groove 11 made in a support strip 1, in which the given top strip 2 is received. In addition, the orientation of each support strip 1 is stabilised by at least one support strip receiving groove 21 in which the support strip 1 is received. In the example shown here, one support strip receiving groove 21 is made in each of the top strips 2.

In all figures, the width of all the grooves 11, 21 is exactly adapted to the thickness of the top strip 2 or support strip 1 which is received in the relevant groove, such that the strips 1, 2 can be received in the grooves 11, 21 with a form fit and friction fit.

For the sake of clarity, fluid passage openings made in the top strips are not shown in FIGS. 1 and 2. In contrast, they are shown, for example, in the component set in FIG. 3A.

Figure 3A:
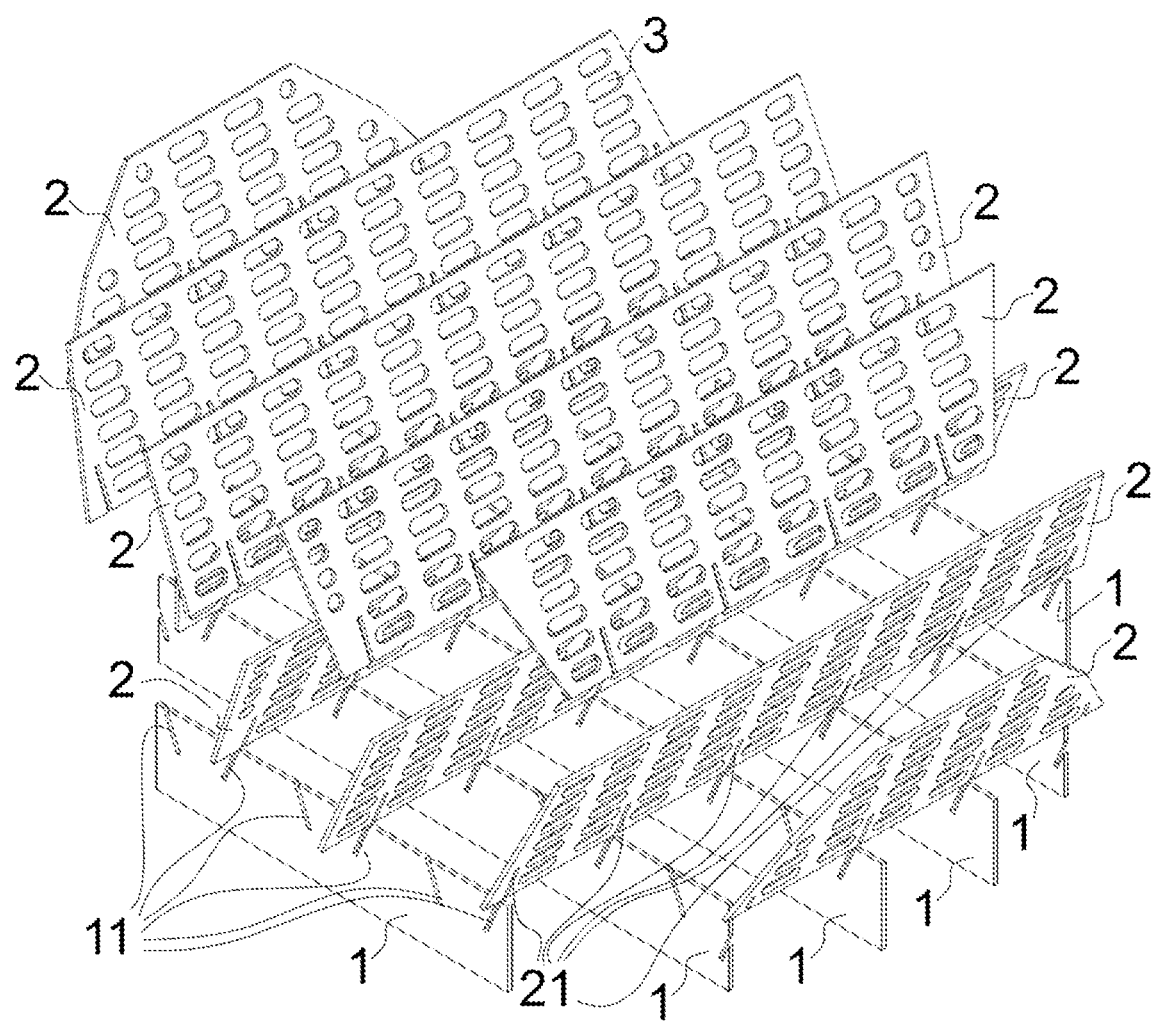
FIG. 3A shows a component set according to the invention.
Figure 3B:
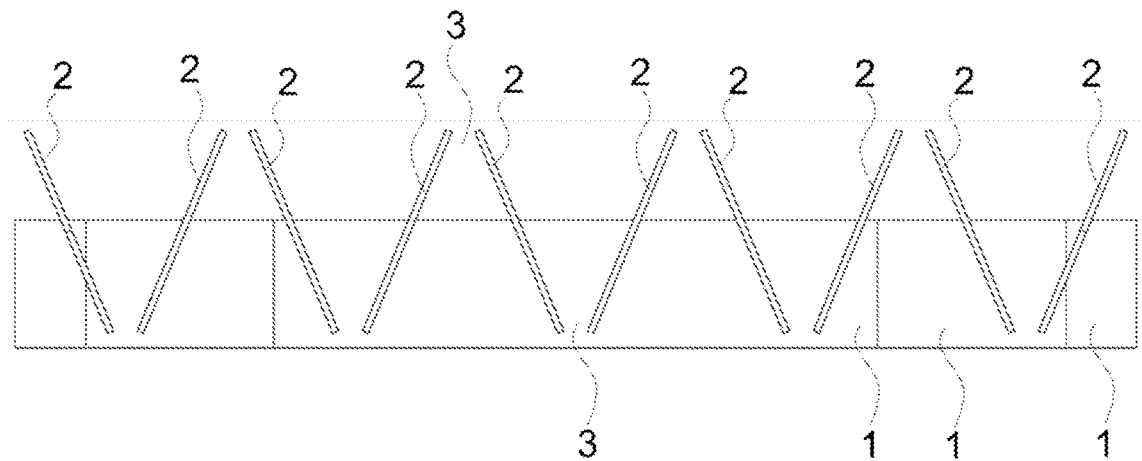
FIG. 3B shows a side view of a support grid according to the invention, which is made from the component set shown in FIG. 3A.
Figure 3C:
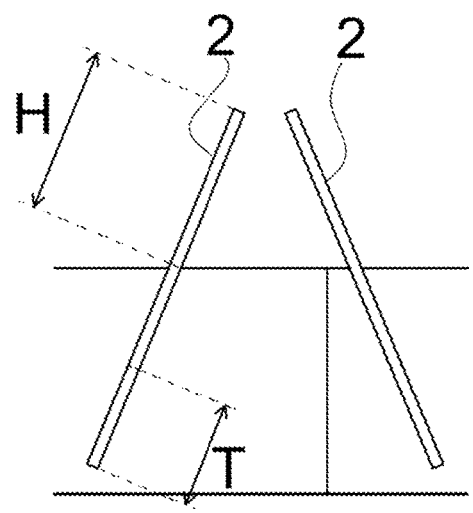
FIG. 3C shows a section of the side view shown in FIG. 3B.
Figure 3D:
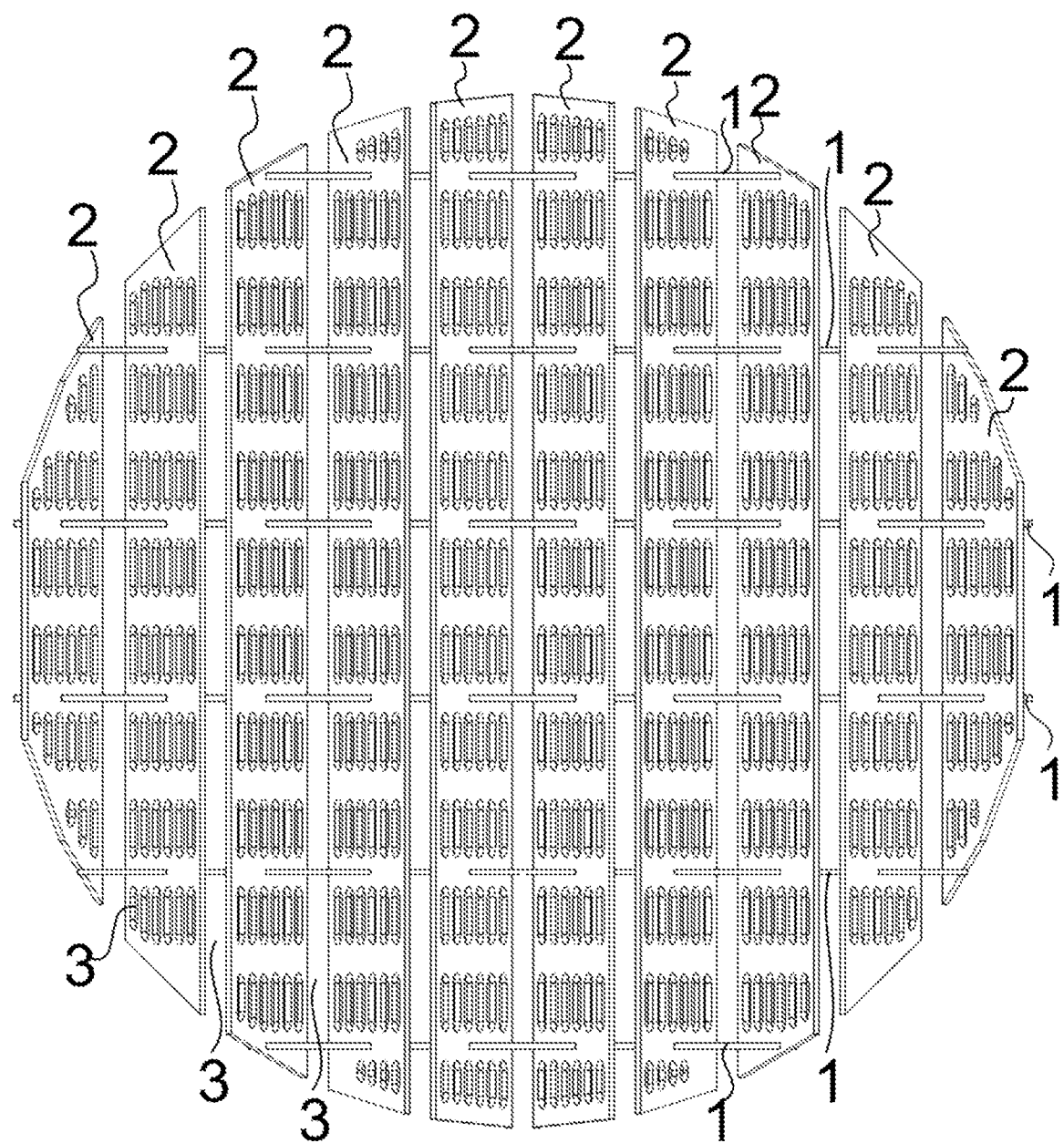
FIG. 3D shows a view of the support grid according to the invention from FIG. 3B, from above.

In FIGS. 3A, 3B and 3D, all support strips 1 and all oppositely inclined top strips 2 of the support grid or component set are clearly visible. Support strips 1 and top strips 2 intersect one another. The view from above in FIG. 3D shows this in a manner similar to the projection described above. It can be seen clearly from FIGS. 3A and 3B that the inclination of each top strip 2 is defined by top strip grooves 11 made in support strips 1. In particular, FIG. 3A shows the top strip receiving grooves 11, which are inclined, rather than being made orthogonal to the upper edge of the respective support strips. The inclination of each top strip receiving groove 11 defines the inclination of each top strip which is/will be received therein in a form-fitting manner 2. The orientation of each support strip 1 is stabilised by a plurality of support strip receiving grooves 21 in which the support strip 1 will be received (FIG. 3A) or is received (FIG. 3B to 3D).

In the example shown here, there is no other component—only support strips 1 and top strips 2. The support strip receiving grooves 21 are thus made in the top strips 2. In the example shown here, at every point where a support strip 1 intersects a top strip 2, a top strip receiving groove 11 is made in the support strip 1, and a support strip receiving groove 21 is made in the top strip 2. At every point where a support strip 1 intersects a top strip 2, a top strip receiving groove 11 and a support strip receiving groove 21 interlock.

It can be seen very clearly from FIG. 3C that, at at least one point where a support strip 1 intersects a top strip 2, the depth T of the support strip receiving groove 21 is less than the height H of a portion of the top strip 2 protruding beyond the support strip 1.

In the example shown in FIG. 3A to 3D, the completely assembled support grid has fluid passage openings 3 in the top strips 2 and between the top strips 2. Fluid passage openings between the top strips 3 are located both between the lower longitudinal edges of the top strips 2 and between the upper longitudinal edges of the top strips 2.

The material of the strips cannot be seen from the figures. In the example shown here, there are top strips 2 and support strips 1 made of carbon fibre-reinforced carbon (CFC). This is a fibre composite material which cannot be independently integrally bonded and—in the case of the CFC used here—comprises a multi-directional non-crimp fabric (a plurality of layers of unidirectional fabrics arranged on top of one another).

The support strips 1 and the top strips 2, including all the grooves 11, 21 and the fluid passage openings arranged in the top strips, have been produced by water jet cutting from appropriate CFC plate material.

The invention claimed is:

1. A support grid for filling material packing, comprising support strips and comprising top strips which are inclined relative to one another in opposite directions, wherein
   the support strips and the top strips intersect one another,
   the inclination of each top strip is defined by at least one top strip receiving groove which is made in at least one support strip and in which the top strip is received, and
   the orientation of each support strip is stabilised by at least one support strip receiving groove in which the support strip is received,
   wherein at least one point at which a support strip intersects a top strip, a depth of the support strip receiving groove is less than the height of a portion of the top strip protruding beyond the support strip.

2. The support grid according to claim 1, wherein at least one of the support strip receiving grooves is made in at least one top strip.

3. The support grid according to claim 1, wherein the inclination of each top strip is defined by more than one top strip receiving groove made in different support strips.

4. The support grid according to claim 1, wherein a top strip receiving groove and a support strip receiving groove interlock at least one point where a support strip intersects a top strip.

5. The support grid according to claim 1, comprising fluid passage openings in and/or between top strips.

6. The support grid according to claim 1, wherein the support strips and/or the top strips comprise a material which cannot be independently integrally bonded.

7. The support grid according to claim 1, wherein the support strips and/or the top strips comprise a fibre composite material.

8. The support grid according to claim 7, wherein the fibre composite material comprises at least one textile fabric.

9. The support grid according to claim 8, wherein at least one textile fabric is a unidirectional fabric.

10. The support grid according to claim 6, wherein the material which cannot be independently integrally bonded comprise carbon fibres.

11. The support grid according to claim 1, wherein at least one top strip has at least two separate top strip portions which are joined together to form the top strip.

12. The support grid according to claim 10, wherein all top strips and top strip portions are shorter than the longest support strip.

13. A support grid cutout which can be inserted into a column via a manhole, comprising support strips and comprising top strip portions which are inclined relative to one another in opposite directions, wherein
   the support strips and the top strip portions intersect one another, the inclination of each top strip portion is defined by at least one top strip receiving groove made in at least one support strip in which the top strip portion is received, and
   the orientation of each support strip is stabilised by at least one support strip receiving groove in which the support strip is received,
   wherein at least one point at which a support strip intersects a top strip, a depth of the support strip receiving groove is less than the height of a portion of the top strip protruding beyond the support strip.

14. A component set for a support grid according to claim 1, comprising
   support strips and top strips or top strip portions, wherein there is at least one top strip receiving groove made in at least one support strip for each top strip or each top strip portion, in which groove the top strips or the top strip portions can be received in such a manner that the top strips or the top strip portions are inclined relative to one another in opposite directions, and
   for each support strip, there is at least one support strip receiving groove made in at least one top strip or in at least one top strip portion, in which groove the support strips can be received in such a manner that the orientation of each support strip is stabilised.

15. The support grid according to claim 7, wherein the fibre composite material comprise carbon fibres.

16. The support grid according to claim 8, wherein the fibre composite material comprise carbon fibres.

17. The support grid according to claim 8, wherein the fibre composite material comprise carbon fibres.

18. A component set for a support grid support grid cutout according to claim 13, comprising
   support strips and top strips or top strip portions, wherein there is at least one top strip receiving groove made in at least one support strip for each top strip or each top strip portion, in which groove the top strips or the top strip portions can be received in such a manner that the top strips or the top strip portions are inclined relative to one another in opposite directions, and
   for each support strip, there is at least one support strip receiving groove made in at least one top strip or in at least one top strip portion, in which groove the support strips can be received in such a manner that the orientation of each support strip is stabilised.

* * * * *